United States Patent
Hopper

(12) 
(10) Patent No.: US 6,347,477 B1
(45) Date of Patent: Feb. 19, 2002

(54) FISHING ROD WITH STRESS RELIEF GRIP AND FOREARM SUPPORT

(76) Inventor: Brad Hopper, 618 Allen Ave., Delray Beach, FL (US) 33483

( * ) Notice: Subject to any disclaimer, the term of this patent is extended or adjusted under 35 U.S.C. 154(b) by 0 days.

(21) Appl. No.: 09/498,285

(22) Filed: Feb. 4, 2000

(51) Int. Cl.[7] .............................................. A01K 87/06
(52) U.S. Cl. ............................. 43/20; 43/25; 43/18.1; 43/18.5; 43/21.2; 242/442; 242/448; 242/281
(58) Field of Search ........................... 43/20, 18.1, 25, 43/23, 18.5, 21.2; 242/281, 442, 448; D22/137, 134

(56) References Cited

U.S. PATENT DOCUMENTS 3,372,509 A * 3/1968 Arsenault
4,222,192 A * 9/1980 Jacobson ........................ 43/22
5,992,079 A * 11/1999 Michels et al. ............... 43/18.1

* cited by examiner

Primary Examiner—Michael J. Carone
Assistant Examiner—Andrea M. Valenti
(74) Attorney, Agent, or Firm—Robert M. Downey

(57) ABSTRACT

The present invention 10 discloses a forearm support member or saddle 16 which is placed under the forearm of the user near the hand grip 18 whereby the user has better control of the fishing rod. The saddle member 16 is designed to relieve stress on the wrist of the user and to aid the user in fighting bigger fish. The saddle member 16 is also used to control the pressure on the rod from the underarm area of the user for use when the user is bottom fishing with the rod. Also shown is a rod member 12 having a longer rear portion 14 and a shorter front portion 20 having an angular hand grip 18 thereinbetween and further having a saddle member 16 mounted thereon. A locking member 34, 36, 38 is shown for placement of the fishing reel 26 onto the forward member 20. Also, the forward rod member 20 has an aperture 40 or other means for receiving the butt of a fishing rod or fishing rod blank.

11 Claims, 1 Drawing Sheet

FISHING ROD WITH STRESS RELIEF GRIP AND FOREARM SUPPORT

BACKGROUND OF THE INVENTION

1. Field of the Invention

The present invention relates generally to fishing rod handles and, more particularly, is concerned with a fishing rod handle having an angular handgrip and an auxiliary support member for receiving the forearm of the user whereby stress on the forearm of the user is reduced.

2. Description of the Prior Art

Fishing rod stabilizing handles have been described in the prior art. However, none of the prior art devices disclose the unique features of the present invention. It is felt that a fishing rod stabilizing handle would be useful.

In U.S. Pat. No. 4,014,129, dated Mar. 29, 1977, Capra disclosed a rod stabilizing handle and attachment for spinning-type fishing rods capable of floating a fishing rod and reel combination. A stabilizing handle member configured for attachment to or at the posterior handle portion of a spinning rod includes an elongate broad upwardly directed surface for normally matingly engaging a substantial length of that forearm of the fisherman which is holding the rod. Rod stabilization forces, distributed along the length of the stabilizing handle, are uniformly transmitted from the forearm to the rod to counterbalance opposing reaction forces when reeling in an object. The handle includes flotation support in a liquid media of the fishing rod and reed combination to which it is attached.

In U.S. Pat. No. 4,190,977, dated Mar. 4, 1980, Casper disclosed a forearm rest for assisting an angler in holding a spinning type of fishing rod and for allowing the angler to freely cast without hindrance. The forearm rest includes a long narrow arcuate position extending outwardly from the handle for accommodating the forearm of the angler and includes a handle attaching portion for secure connection to a desired position along the handle of the fishing rod.

In U.S. Pat. No. 5,159,775, dated Nov. 3, 1992, Sutula, Jr., disclosed a fishing rod with a support handle wherein the handle is designed to distribute force along its multiple points. Two embodiments are shown. In the preferred embodiment, the handle includes a hook-shaped wrist support that wraps around the majority of the user's wrist, but allows easy access and exist; a forearm cradle that cups the user's arm, near his elbow; and a strap that holds the aim in the cradle. In an alternate embodiment, the wrist support is tunnel-shaped and surrounds the user's entire wrist.

In U.S. Pat. No. 4,041,635, dated Aug. 16, 1977, Savage disclosed device to afford leverage to fishermen when handling a fishing rod and reel. The device is attached to or formed with the handle of a conventional fishing rod and sized to extend to the underarm of the fisherman. One embodiment of the device is formed of material having lower density than water to afford flotation characteristics.

In U.S. Pat. No. 5,390,439, dated Feb. 21, 1995, Warren, Jr., disclosed an arm support for stabilizing a fishing rod on a fisherman's arm when lures are retrieved and fish are hooked and played. In a preferred embodiment the arm support is characterized by a rod having a straight portion mounted on the fishing rod handle and a curved portion extending from the straight portion. The straight portion protrudes rearwardly from fixed or removable attachment to the handle of the fishing rod and the curved portion fits beneath the fisherman's forearm, supporting the fisherman's wrist against the weight and playing force of the fish. In another embodiment a reel seat and fishing rod connecting threads are provided on the straight portion of the arm support for receiving a reel and mounting the arm support on a fishing rod, respectively.

In U.S. Pat. No 5,529,357, dated Jun. 25, 1996, Hoffman disclosed a full motion leverage enhancing assembly provided for attachment to the handle of a mop, broom, rake or similar tool which has an elongate handle and a center of gravity strongly skewed away from the grip point utilized by the tool operator. In this embodiment, the leverage enhancing assembly comprises an arm clamp for securing the tool handle to a single arm of the user and a grasping shaft for grasping the tool handle. The arm clamp is comprised of a first rigid longitudinal segment adjustably attached to the end of the tool handle proximate to the user by a semi-rigid clamp having an adjustable circumference. The arm clamp is further provided with a pair of flexible, adjustably interlocking straps extending from the proximal end of the longitudinal segment opposite the clamp. The straps are constituted to form a semi-permanently and adjustable substantially circular clasp for receiving and securing a portion of the user's forearm. The grasping shaft comprises a second rigid longitudinal segment attached to the tool handle by a semi-rigid clamp opposite t he user relative to the arm clamp and in axial alignment with the arm clamp. This second longitudinal segment is furthered configured to be adjustable matable to the first longitudinal segment. The grasping shaft is substantially perpendicularly protruding from the second longitudinal segment and has an abutment flange for increasing the stability of the user's grip on the grasping shaft.

In U.S. Pat. No. 4,498,257, dated Feb. 12, 1985, Jekel disclosed a fishing rod butt which fits onto the end of a fishing rod and which has a pivoting body support opposite the fishing rod which pivots so that, when the fishing rod butt is held against the body of the fisherman, as during game fishing, the pressure of the fishing rod butt, which would normally be felt over a very small (approximately one and one-half square inch) area of the abdomen, is effectively spread over a larger area of the fisherman's abdomen, thus affording comfort during fishing. Included are three unique mechanisms for locking the pivoting body support of the fishing rod butt in position with respect to the main butt structure.

In U.S. Pat. No. 5,363,586, dated Nov. 15, 1994, Balkenbush disclosed a fishing rod handle for providing a more comfortable and efficient grip during retrieving which includes two distinct grips, one to be utilized during the casting motion and a separate grip to be utilized during the retrieving motion. The handle includes a reel seat on which a fishing reel is mounted, and a casting grip defined on the handle behind the reel position. The handle further includes a retrieving grip which is attached to the handle forward of the reel. The retrieving grip includes a support segment which extends upwardly from the handle, and a gripping segment which extends rearward from the support segment, so that the gripping segment is positioned above the fishing reel. This configuration is advantageous in that it provides a fisherman with a gripping location which facilitates improved balance, and which allows the fisherman to more comfortably and efficiently overcome the difficulties incurred due to the opposing upward and downward forces created during hook setting and fish retrieving.

In U.S. Pat. No. 4,577,432, dated Mar. 25, 1986, Brackett, et al., disclosed an improved fishing rod handle construction which is shaped to conform to the grip of the user. The handle is offset from the axis of the fishing rod. In addition, in one embodiment the handle is at an angle to the axis of the fishing rod. In another embodiment the handle takes a left-handed or right-handed helical form. The rod shaft runs all the way through the handle for greater strength and sensitivity than conventional offset handles. The handle provides a mechanical advantage over a straight handle in addition to greater comfort and conformity to the shape of the grip of a user.

In U.S. Pat. No. 4,653,215, dated Mar. 31, 1987, Strader disclosed a fishing rod and reel system including a fulcrum gripping portion which also aligns the rod and a leverage gripping portion for providing lengthy and arcuate line castings with also an arm or body brace. The fishing pole has a long slender body with a longitudinal center line. The leverage gripping portion and a tip are on opposite ends of the fishing pole. The fulcrum gripping portion is positioned between the leverage gripping portion and the tip. A user places a first hand on the fulcrum gripping portion and the second hand on the leverage gripping portion, the first hand is held in one general position with the user's wrist allowing the fishing pole to pivot about the first hand. The second hand in contact with the leverage portion is quickly moved along an arcuate path about the first hand thereby casting line and lure or weight from the tip of the fishing rod.

While these fishing rod support stabilizing handles may be suitable for the purposes for which they were designed, they would not be as suitable for the purposes of the present invention, as hereinafter described.

SUMMARY OF THE INVENTION

The present invention discloses a fishing rod handle forearm support member or saddle which is placed under the forearm of the user near the hand grip whereby the user has better control of the fishing rod. The saddle member is designed to relieve stress on the wrist of the user and to aid the user in fighting bigger fish. The saddle member is also used to control the pressure on the rod from the underarm area of the user for use when the user is bottom fishing with the rod. Also shown is a rod member having a longer rear portion and a shorter front portion having an angular handgrip thereinbetween and further having a saddle member mounted thereon. A locking member is shown for placement of the fishing reel onto the forward member. Also, the forward rod member has means for receiving the butt of a fishing rod.

An object of the present invention is to allow the fisherman to exert more force on the fishing rod. A further object of the present invention is to relieve stress on the wrist of the user. Another object of the present invention is to provide a more comfortable hand grip surface for the fisherman's hand so that he can better and more conveniently grip the rod.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts.

BRIEF DESCRIPTION OF THE DRAWINGS

In order that the invention may be more fully understood, it will now be described, by way of example, with reference to the accompanying drawing in which.

LIST OF REFERENCE NUMERALS

Figure 1:
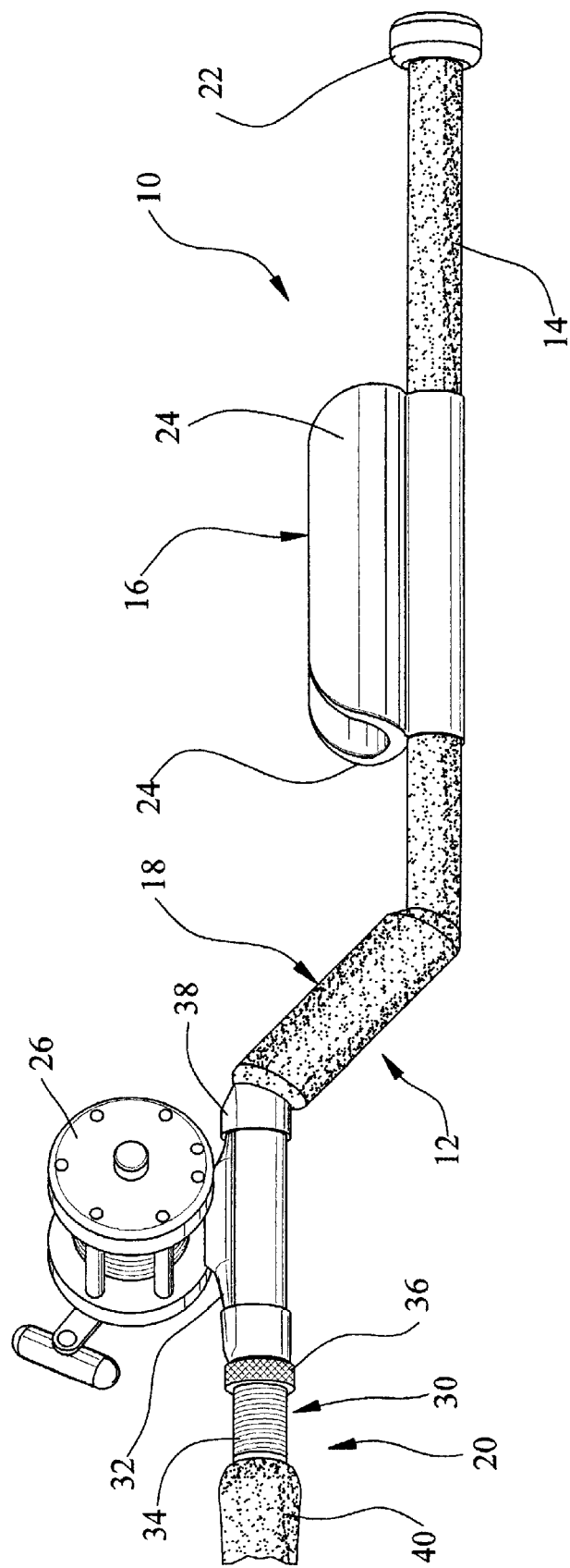
FIG. 1 is a perspective view of the present invention.

With regard to reference numerals used, the following numbering is used the drawing.

10 present invention
12 handle
14 rear portion
16 saddle
18 hand grip
20 front portion
22 butt cap
24 sides of saddle
26 reel
28 reel seat
30 locking member
32 base of reel
34 threads
36 nut
38 hood member
40 aperture

DESCRIPTION OF THE PREFERRED EMBODIMENTS

Turning now descriptively to the drawing, in which similar reference characters denote similar elements throughout, FIG. 1 illustrates the present invention wherein an improved fishing rod handle is disclosed.

Turning to FIG. 1, therein is shown a perspective view of the present invention 10. Shown there is an elongated fishing rod handle member 12 having a topside and an underside having a longer rear portion 14 having a saddle 16 attached thereon to the topside for receiving the forearm of the user. The longer portion 14 is connected through an angular hand grip 18 to a shorter front portion of the rod handle 20. The hand grip 18 is attached so as to form approximately a 45 degree angle with the rear portion 14 and front portion 20 of the handle 12. The rear portion has an enlarged rubber cap 22 which is used to support the longer end 14 of the handle 12 against the body of the user and for placement in a rod holder. The U-shaped saddle 16 conforms to the shape of the underarm of the forearm of the user being approximately 4½ inches in width and approximately 8 inches in length, having a height of approximately 1¾ inches and having a thickness of approximately ⅛ inch. The height of the sides 24 of the saddle provide a receptacle and a lateral support for the forearm of the user which provides increased stability and control, without slipping away from the forearm while fighting a fish. The sides 24 of the saddle, conforming to and wrapping around the sides of the forearm eliminate the need for fastening straps which tend to be awkward and uncomfortable. In one embodiment of the invention, the saddle 16 is fixed to the end 14 of the handle 12. In another embodiment, the saddle 16 is removable from the end 14 using clips, brackets or other means, thereby enabling the handle 12 to be used with or without the saddle 16.

Hand grip 18 and rod handle 12 may also be completely or partially foam-covered and hand grip 18 has a grip length of approximately 3 inches. The front end 20 of the handle 12 has a fishing reel 26 mounted thereon on the topside having a reel seat means 28 for receiving the reel 26 which has an attachment or locking member means 30 for attaching the base 32 of the reel 26. Locking member 30 has a threaded member 34 and mating threaded nut 36 for locking the reel 26 to the rod 12 in a conventional manner which includes a non-movable, hood-like member 38 which receives one end of the base 32 of the reel. The fishing rod 10, including the handle 12, may be manufactured as an integral, one-piece unit from the butt end 22 to a distal tip (not shown) of the rod. Alternatively, the handle portion 12 may be provided as a separate piece for attachment with a shaft portion (i.e., fishing rod blank) of a fishing rod. In this instance, the front portion 20 may be provided with a hollow end or aperture 40 for receiving the butt of the fishing rod or fishing rod blank. However, a fishing rod or rod blank may be attached to handle 12 in any conventional manner as would be done by one skilled in the art, including have a rod with handle connecting means.

I claim:

1. A handle for use with a fishing rod and a fishing reel, said handle comprising:
   a front portion including a top side and an underside;
   a rear portion including a top side and an underside;
   a mid-portion between said front and rear portions and said mid-portion extending from said front portion at a downward angle to said rear portion and defining an uninterrupted angled handgrip;
   an elongate saddle member on said top side of said rear portion, said elongate saddle member having a U-shaped cross-sectional configuration which is structured and disposed to conform to the shape of the user's forearm along a substantial length of the user's forearm to provide stability and control and to prevent movement of said rear portion of said handle relative to the user's forearm; and
   reel mounting means on said top side of said front portion for removably mounting the fishing reel on said handle.

2. The handle as recited in claim 1 wherein said uninterrupted angled handgrip is positioned and disposed at an angle of 45 degrees relative to a longitudinal axis of said front portion.

3. The handle as recited in claim 2 wherein said uninterrupted angled handgrip is positioned and disposed at an angle of 45 degrees relative to a longitudinal axis of said rear portion.

4. The handle as recited in claim 1 wherein said elongate saddle member has a length of at least eight inches.

5. The handle as recited in claim 1 wherein said uninterrupted angled handgrip includes a foam cover.

6. The handle as recited in claim 1 wherein said elongate saddle member includes an inner foam lining for engagement with the user's forearm.

7. A handle on a fishing rod for use with a conventional fishing reel, said handle comprising:
   a front portion including a top side and an underside;
   a rear portion including a top side and an underside;
   a mid-portion between said front and rear portions and said mid-portion extending from said front portion at a downward angle to said rear portion and including a foam cushion covering an entire length of said mid-portion and defining an uninterrupted angled handgrip;
   an elongate saddle member on said top side of said rear portion, said elongate saddle member having a U-shaped cross-sectional configuration which is structured and disposed to conform to the shape of the user's forearm to provide stability and control and to prevent movement of said rear portion of said handle relative to the user's forearm; and
   reel mounting means on said top side of said front portion for removably mounting the conventional fishing reel on said handle.

8. The handle as recited in claim 7 wherein said uninterrupted angled handgrip is positioned and disposed at an angle of 45 degrees relative to a longitudinal axis of said front portion.

9. The handle as recited in claim 8 wherein said uninterrupted angled handgrip is positioned and disposed at an angle of 45 degrees relative to a longitudinal axis of said rear portion.

10. The handle as recited in claim 7 wherein said elongate saddle member has a length of at least eight inches.

11. The handle as recited in claim 7 wherein said elongate saddle member includes an inner foam lining for engagement with the user's forearm.

* * * * *